(12) United States Patent
Kim et al.

(10) Patent No.: US 11,161,728 B2
(45) Date of Patent: Nov. 2, 2021

(54) STERILIZATION CONTROL METHOD OF WATER PURIFIER

(71) Applicant: LG ELECTRONICS INC., Seoul (KR)

(72) Inventors: Youngjin Kim, Seoul (KR); Jongho Park, Seoul (KR); Kowoon Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 16/470,809

(22) PCT Filed: Dec. 22, 2017

(86) PCT No.: PCT/KR2017/015399
§ 371 (c)(1),
(2) Date: Jun. 18, 2019

(87) PCT Pub. No.: WO2018/124668
PCT Pub. Date: Jul. 5, 2018

(65) Prior Publication Data
US 2019/0382254 A1 Dec. 19, 2019

(30) Foreign Application Priority Data
Dec. 26, 2016 (KR) .................. 10-2016-0179095

(51) Int. Cl.
*B67D 1/08* (2006.01)
*B01D 35/04* (2006.01)
(Continued)

(52) U.S. Cl.
CPC .......... *B67D 1/0878* (2013.01); *B01D 35/04* (2013.01); *C02F 1/008* (2013.01); *C02F 1/32* (2013.01);
(Continued)

(58) Field of Classification Search
None
See application file for complete search history.

(56) References Cited

U.S. PATENT DOCUMENTS

2016/0362286 A1* 12/2016 Yui ..................... B67D 3/0038

FOREIGN PATENT DOCUMENTS

| JP | 2014-136113 | 7/2014 |
| KR | 20-0393066 | 8/2005 |
| (Continued) | | |

OTHER PUBLICATIONS

International Search Report dated Apr. 17, 2018 issued in Application No. PCT/KR2017/015399.

*Primary Examiner* — Richard C Gurtowski
(74) *Attorney, Agent, or Firm* — Ked & Associates, LLP

(57) ABSTRACT

A method for controlling sterilization of a water purifier according to an embodiment of the present invention includes a housing accommodating components for generating cold water and/or hot water; a water chute which protrudes from a front surface of the housing and includes a water outflow part extending downward; and a light emitting element which is mounted inside the water chute corresponding to an upper end of the water outflow part and emits ultraviolet rays for sterilization, and the method includes when a sterilization mode is started, turning on the light emitting element for a first set time and to emit ultraviolet rays through the water outflow part; and after the lapse of the first set time, turning off the light emitting element for a second set time to stop emission of ultraviolet rays, in which a sterilization cycle is defined as a sum of the first set time and the second set time, in which the sterilization mode is started at the same time when the water purifier is powered on, and in which the first set time is set such that the sterilization mode is performed for one day so that the amount of ultraviolet rays emitted to the outside of the water
(Continued)

outflow part is less than 3 mJ/cm² during the accumulated on time of the light emitting element.

5 Claims, 4 Drawing Sheets

(51) Int. Cl.
  *C02F 1/00* (2006.01)
  *C02F 1/32* (2006.01)
(52) U.S. Cl.
  CPC ............... *B67D 2210/00015* (2013.01); *C02F 2201/326* (2013.01); *C02F 2209/44* (2013.01)

(56) References Cited

FOREIGN PATENT DOCUMENTS

| | | |
|---|---|---|
| KR | 10-2010-0131802 | 12/2010 |
| KR | 10-2011-0128974 | 12/2011 |
| KR | 10-2012-0037141 | 4/2012 |

* cited by examiner

STERILIZATION CONTROL METHOD OF WATER PURIFIER

CROSS-REFERENCE TO RELATED PATENT APPLICATIONS

This application is a U.S. National Stage Application under 35 U.S.C. 0 371 of PCT Application No. PCT/KR2017/015399, filed Dec. 22, 2017, which claims priority to Korean Patent Application No. 10-2016-0179095, filed Dec. 26, 2016, whose entire disclosures are hereby incorporated by reference.

TECHNICAL FIELD

The present invention relates to a method for controlling sterilization of water purifier.

BACKGROUND ART

A water purifier can be defined as a device which filters harmful elements such as foreign substances or heavy metals contained in tap water.

A water purifying filter is used to purify the tap water flowing into the water purifier, and an ultraviolet sterilization method is used to sterilize the inside of a water cock from which water is discharged.

Korean Utility Model Registration No. 20-0393066 (Aug. 9, 2005) which is the related art discloses a structure for sterilizing water inside a water cock by mounting an LED which emits ultraviolet rays on an upper side of a water cock.

DISCLOSURE

Technical Problem

In a case of the related art, there are following problems.

Since ultraviolet rays for sterilization are exposed to the outside of the water outflow part of the water purifier, there is a risk of injury in a case where the user is exposed to ultraviolet rays for a long time.

Generally, the cumulative ultraviolet exposure amount allowed during a day is known to be 3 mJ/cm2 (Source: American Conference of Governmental Industrial Hygienists), that is, when the amount of ultraviolet rays irradiated on the human skin during a day is not more than 3 mJ/cm2, there is no fear of skin damage, but in a case where the allowable exposure amount is exceeded, it may cause a problem to the body.

Particularly, in a case of a water purifier, since the water purifier is a household appliance frequently used by the user, the user can easily be exposed to the ultraviolet rays emitted during the sterilization process of the water tap. Therefore, in a case where the amount of ultraviolet rays emitted from the sterilization process exceeds the daily allowable value, the user may be injured by the ultraviolet ray when the user holds the finger on the water tap from the start point to the end point of the sterilization mode.

Especially in a case of children, since the skin is weaker than an adult, so the children can be easily injured.

Nevertheless, in order to maximize the sterilizing effect, the water purifier equipped with the ultraviolet sterilizer currently sold on the market is controlled so that the sterilization mode is performed without considering the daily ultraviolet ray exposure allowance. In other words, since ultraviolet rays are continuously controlled to maintain the on state during the sterilization mode execution time, there is a concern that the skin of the user is damaged.

Technical Solution

In order to achieve the above objective, according to an embodiment of the present invention, there is provided a method for controlling sterilization of a water purifier including a housing accommodating components for generating cold water and/or hot water; a water chute which protrudes from a front surface of the housing and includes a water outflow part extending downward; and a light emitting element which is mounted inside the water chute corresponding to an upper end of the water outflow part and emits ultraviolet rays for sterilization, and the method including when a sterilization mode is started, turning on the light emitting element for a first set time and to emit ultraviolet rays through the water outflow part; and after the lapse of the first set time, turning off the light emitting element for a second set time to stop emission of ultraviolet rays, in which a sterilization cycle is defined as a sum of the first set time and the second set time, in which the sterilization mode is started at the same time when the water purifier is powered on, and in which the first set time is set such that the sterilization mode is performed for one day so that the amount of ultraviolet rays emitted to the outside of the water outflow part is less than 3 mJ/cm$^2$ during the accumulated on time of the light emitting element.

Advantageous Effect

According to the method for controlling sterilization of a water purifier according to the embodiment of the present invention configured as described above, even if the user exposes the finger to the water outflow part of the water purifier by shortening the on time and lengthening the off time of the light emitting element in the sterilization mode, there is an effect that the user is not damaged.

BEST MODE

Hereinafter, a method for controlling sterilization of a water purifier according to an embodiment of the present invention will be described with reference to the drawings.

Figure 1:
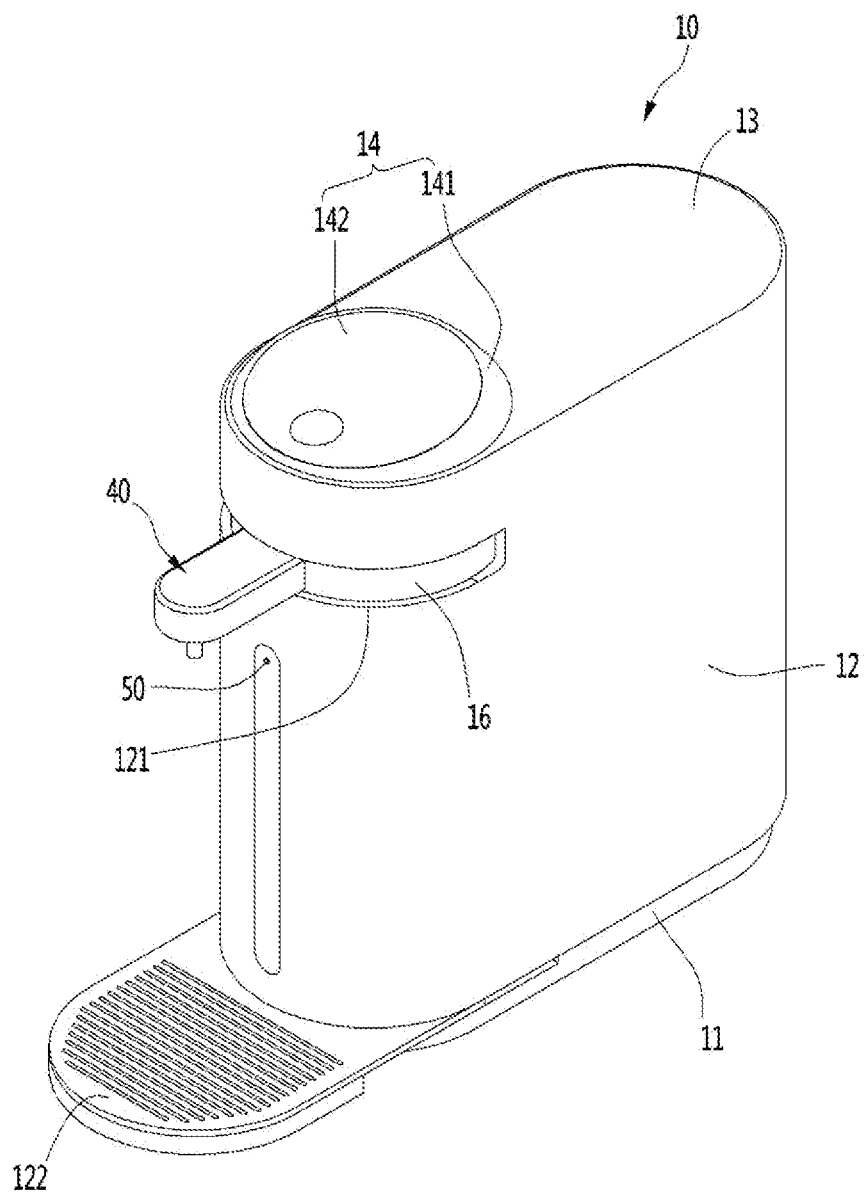
FIG. 1 is a perspective view illustrating a water purifier to which a sterilization control method according to an embodiment of the present invention is applied.
Figure 2:
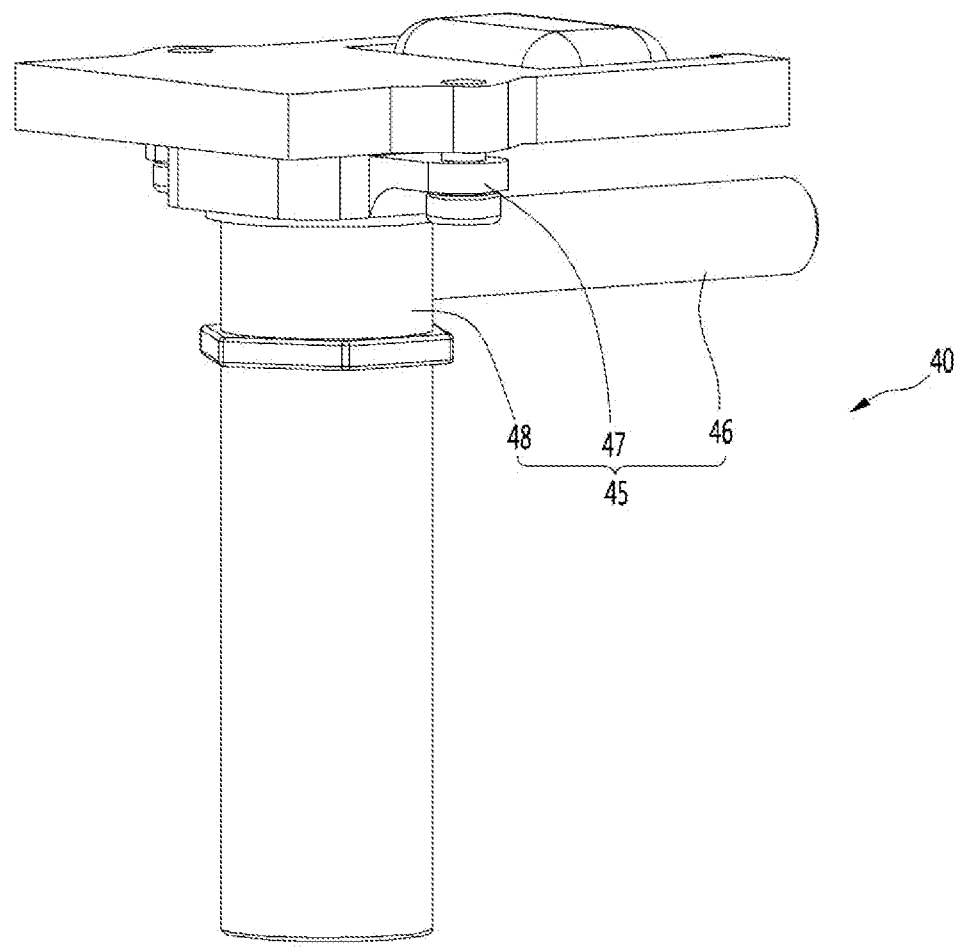
FIG. 2 is a perspective view illustrating a water chute constituting the water purifier.
Figure 3:
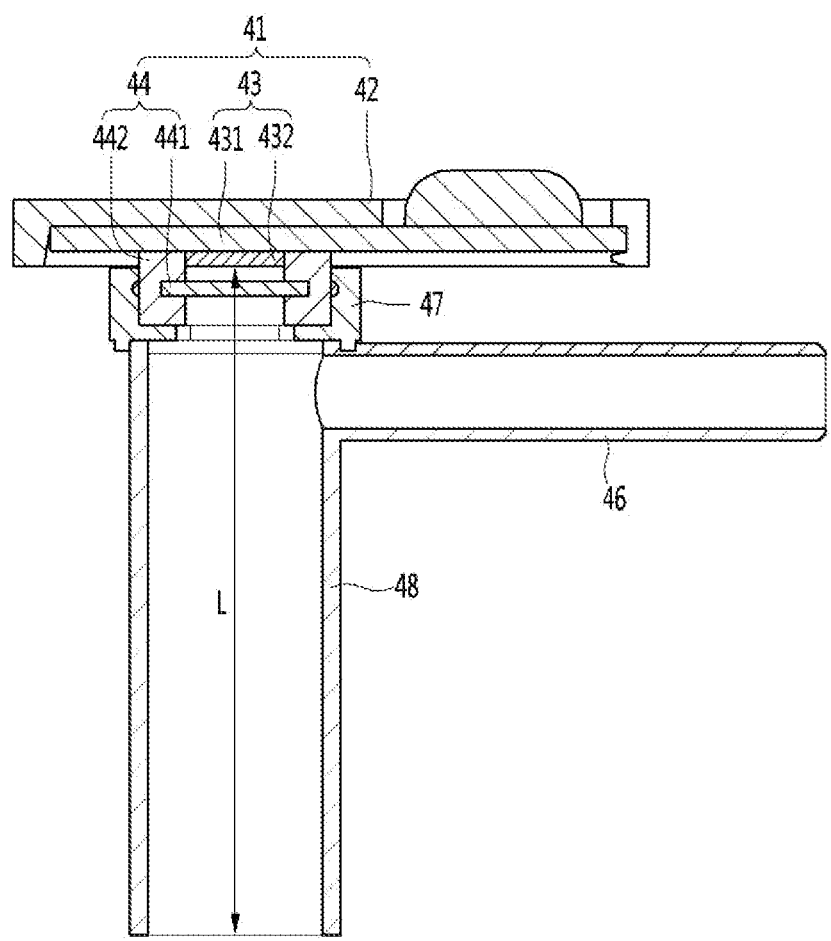
FIG. 3 is a longitudinal sectional view illustrating the water chute taken along line 3-3 in FIG. 2.

FIG. 1 is a perspective view illustrating a water purifier to which a sterilization control method according to an embodiment of the present invention is applied, FIG. 2 is a perspective view illustrating a water chute constituting the water purifier, and FIG. 3 is a longitudinal sectional view illustrating the water chute taken along line 3-3 in FIG. 2.

Referring to FIGS. 1 to 3, the water purifier 10 according to the embodiment of the present invention may include a direct watering type cooling and heating water purifier for cooling or heating water directly supplied from an external water supply source and discharging the water, but is not limited thereto. In other words, the sterilization mechanism of the present invention can be also applied to a water purifier having a reservoir.

In detail, the water purifier 10 may include a base 11 constituting a bottom part, a housing 12 placed on an upper surface edge of the base 11, a cover 13 covering an opened upper surface of the housing 12, a control panel 14 formed on the upper surface of the cover 13, and a water chute 40 protruding from the outer circumferential surface of the housing 12.

More specifically, a part where the water chute 40 is formed may be defined as a front surface of the water purifier 10, and an opposite surface thereto may be defined as a rear surface of the water purifier 10.

In addition, the control panel 14 may be formed at a position close to the front end of the water purifier 10 and may be formed at a position close to the center part or the rear end of the water purifier 10 according to design conditions. In addition, the control panel 14 may be inclined in such a manner that the height of the control panel 14 increases toward the rear so that the control panel 14 can be easily recognized by the user's eyes positioned in front of the water chute 40.

In detail, the control panel 14 may include a panel main body 141 having a rear end protruding higher than the front end of the water purifier 10 from the upper surface thereof and a panel cover 142 covering the upper surface of the panel main body 141. In addition, the control panel 14 may include a plurality of operation buttons including a power button. For example, the operation buttons provided on the control panel 14 may include a power button, a water discharge button, a button for selecting the type of water to be discharged, a button for setting the water temperature, a button for setting the amount of water to be discharged, and the like.

In addition, the water chute 40 may be extended forward by a predetermined length from the front end of the water purifier 10 and may be rotatably mounted within a range of 90 degrees from the center of the front end of the water purifier 10 in a lateral direction, respectively. In other words, the water chute 40 can rotate 180 degrees in total. Of course, the water chute 40 may be fixed to the front surface of the housing 12.

In addition, a rotation guide 16 having a circular band shape may be mounted on the rear end of the water chute 40 so that the water chute 40 can rotate. The water chute 40 and the rotation guide 16 can be injection-molded into one body or can be formed as separate parts and joined as one body by a fastening member.

In addition, a guide hole 121 for guiding the rotation of the water chute 40 may be formed on the front surface of the housing 12 and the water chute 40 can rotate along the guide hole 121 by 90 degrees in the lateral direction. The water chute 40 may include a chute case 401.

In addition, a tray 122 is mounted on the lower end of the front surface of the housing 12 so that a part of the water discharged from the water chute 40 or a water drop falling from the water chute 40 can be collected. The tray 122 may also be designed so as to be rotatable by a predetermined angle designed in the same manner as in the water chute 40 in the lateral direction.

In addition, the water chute 40 may include the chute case 401, a water cock 45 accommodated in the chute case 401, and a sterilization module 41 for sterilizing an inside of the water cock 45.

In detail, the water cock 45 may include a water inflow part 46 extending in the horizontal direction, a water outflow part 48 extending in the vertical direction at the end of the water inflow part 46, and a waterproof unit seating part 47 formed on an upper end of the water outflow part 48. The waterproof unit seating part 47 may be fixed to the bottom surface of the sterilization module 41 by being formed with the water outflow part 48 as one body.

Alternatively, the waterproof unit seating part 47 may be provided as an independent component, and the upper surface and the lower surface thereof may be fixed to the bottom surface of the sterilization module 41 and the upper surface of the water outflow part 48, respectively. In order to minimize leakage, the waterproof unit seating part 47 may be formed as a part of the water outflow part 48.

The sterilization module 41 may include a light emitting unit 43, a bracket 42 on which the light emitting unit 43 is mounted, and a waterproofing unit 44 disposed on the lower side of the bracket 42.

In detail, the light emitting unit 43 may include a light emitting element 432 which emits ultraviolet rays, and a substrate 431 on which the light emitting element 432 is mounted. In addition, the light emitting element 432 may be an LED element which emits ultraviolet rays having a wavelength of 300 nm to 400 nm, specifically, a wavelength of 380 nm.

In addition, the waterproof unit 44 is installed to prevent water flowing along the inside of the water cock 45 from splashing toward the light emitting element 432. Specifically, the waterproof unit 44 may include a transparent plate 441, and a sealer 442 surrounding the edge of the transparent plate 441. The transparent plate 441 may be made of plastic or glass.

On the other hand, ultraviolet rays emitted from the light emitting unit 43, specifically, the light emitting element 432 passes through the water outflow part 48 and are discharged toward the bottom. The amount of ultraviolet rays measured at the end of the water outflow part 48 is determined by the distance L from the light emitting element 432 to the end of the water outflow part 48.

For example, in a case where the distance L to the end of the water outflow part 48 is 3 cm, the ultraviolet intensity is 0.05 mW/cm$^2$. Specifically, in a case of a water purifier having a distance of 3 cm to the end of the water outflow part 48, when the allowable cumulative leakage amount of the ultraviolet rays is 3 mJ/cm$^2$, the maximum allowable exposure time exposed to ultraviolet rays is 60 seconds. In other words, in a case where the user puts his/her finger at the end of the water outflow part 48 for more than 60 seconds, the user may be injured due to overexposure to ultraviolet rays.

Therefore, even if the user puts his/her finger on the end of the water outflow part 48 for a time longer than 60 seconds, it is necessary to take the on time of the light emitting element 432 short and to take the off time thereof relatively long so that the use is not injured by ultraviolet rays, there is a need to take the off time long.

Figure 4:
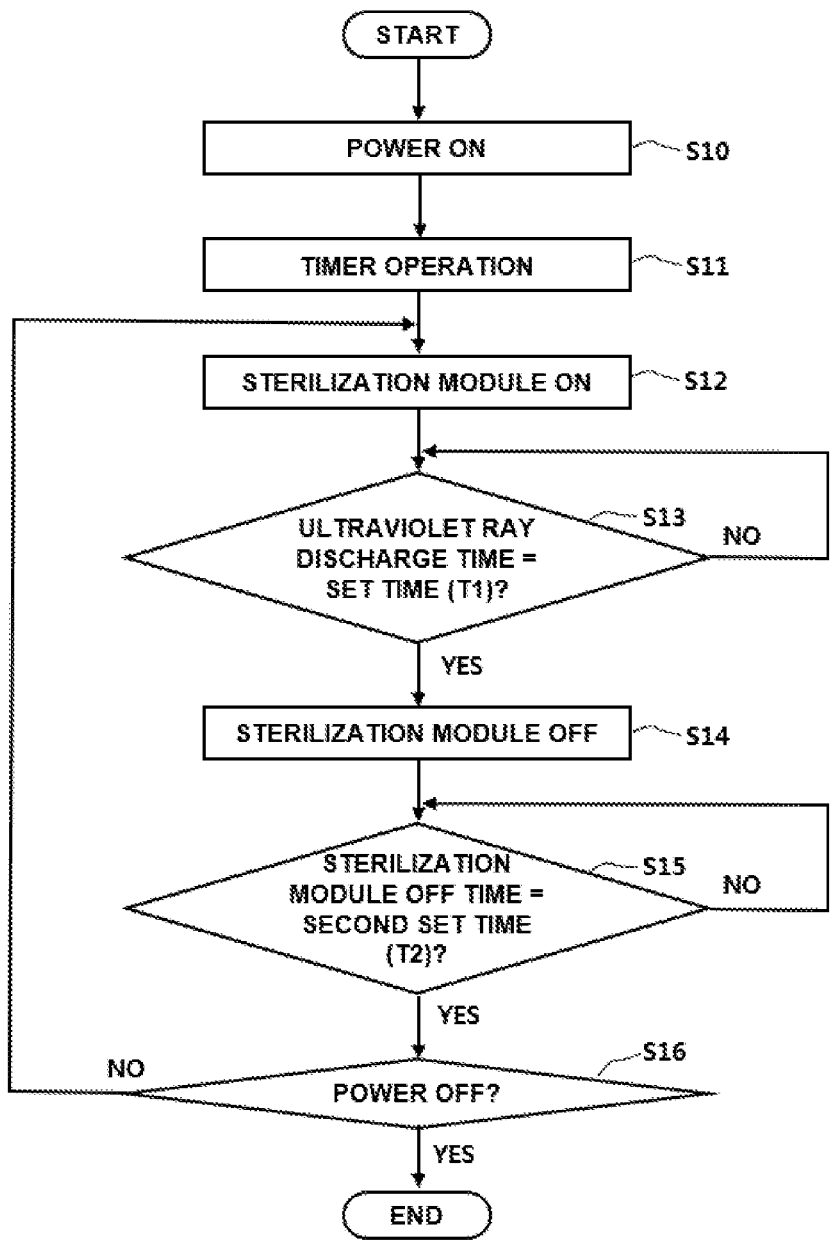
FIG. 4 is a flow chart illustrating a method for controlling sterilization of a water purifier according to an embodiment of the present invention.

FIG. 4 is a flow chart illustrating a method for controlling sterilization of a water purifier according to an embodiment of the present invention.

Referring to FIG. 4, when the water purifier is powered on (S10), the timer is activated (S11) and ready to count the on time of the light emitting unit 43. When the set time has elapsed from the moment the power of the water purifier is turned on, the sterilization mode is started and the sterilization module 41 is turned on.

Here, the turning on of the sterilization module 41 means that the light emitting element 432 emitting ultraviolet rays is turned on to emit ultraviolet rays and that the turning off of the sterilization module 41 means that the light emitting element 432 is turned off to stop ultraviolet ray emission.

Also, the sterilization mode is started and the power of the water purifier is turned on, and the on/off operation of the sterilization module is periodically performed.

In detail, the sterilization module is turned on and the time when ultraviolet rays are emitted from the light emitting element 432 is counted by the timer, and it is determined whether the ultraviolet ray emission time has reached the first set time T1 (S13).

If it is determined that the ultraviolet ray emission time has reached the first set time T1, the sterilization module 41 is turned off (S14). In other words, the light emitting element 432 is turned off.

In addition, if it is determined through the timer that the off time of the sterilization module has reached the second set time T2 (S15) and it is determined that the sterilization module off time has reached the second set time (T2), the process of turning on the sterilization module is repeated again. Therefore, the sum of the first set time T1 and the second set time T2 is defined as a sterilization cycle. However, if the power of the water purifier is turned off in a state where the sterilization module is off (S16), the sterilization control method according to the present invention also ends.

As described above, if the on time of the light emitting element 432 is shortened by dividing by the time which does not exceed the daily maximum allowable exposure time of ultraviolet rays and the off time is relatively long, skin damage due to ultraviolet rays can be prevented.

In other words, by increasing the off time of the light emitting element 432, even if the user takes a long time to be exposed to ultraviolet rays emitted through the end of the water outflow part 48, the possibility of reaching the cumulative allowable exposure amount can be minimized have.

For example, assuming that the ultraviolet ray leakage amount measured at the end of the water outflow part 48 is 0.05 mW/cm$^2$, since the cumulative exposure amount of ultraviolet rays allowed for a day is 3 mJ/cm$^2$, the skin of the user should not be exposed to the end of the water outlet part 48 for more than 60 seconds.

Therefore, when the ultraviolet sterilization mode is started, it is preferable that the on time of the light emitting element 432 is kept less than 60 seconds. Considering the time that the user can hold the finger on the end of the water outlet part 48, 60 seconds can be considered to be enough time. Therefore, in consideration of the maximum time that the user can be patient in a state of holding the finger at the end of the water outflow part 48, it is necessary to control the on-time and the off-time of the light emitting element 432 so that exposure to ultraviolet light for the maximum amount of time does not exceed the daily allowable cumulative exposure.

For example, if the operation period of the sterilization module is 1 minute and the light emitting element 432 is turned on for 1 second per each cycle, it takes at least an hour for the amount of ultraviolet rays irradiated to the skin of the user to reach the daily allowable cumulative exposure (3 mJ/cm$^2$). In other words, it means that the user must expose the skin to the water outflow part for at least one hour.

By making the conditions more stringent, in a case where the operation period of the sterilizing module, that is, the sterilization period is set to 24 minutes and the on time of the light emitting element 432 is set to 1 second for one cycle, since the cumulative on time should be set to 60 seconds, 60 cycles must be performed. In addition, the sterilization cycle takes a total of 24 hours to perform 60 cycles. In other words, in a case where the user has to expose the skin to the water outflow part during a day, the skin may be damaged. Under such conditions, unless the user exposes the skin to the water outflow part for 24 hours, since it means that the amount of exposure to ultraviolet rays does not reach the daily allowable cumulative exposure amount, the possibility of injury by ultraviolet rays can be completely eliminated.

If the sterilization cycle is 60 minutes and the on time of the light emitting element 432 per cycle is set to 5 seconds, 12 cycles have to be performed so as to reach the allowable cumulative exposure amount. In other words, 12 hours have to elapse so as to emit an amount of ultraviolet rays to cause skin injury, which means that the skin of the user can be damaged only if the user touches the hand of the user with the end of the water outflow part line for at least 12 hours.

As described above, by shortening the time for continuously emitting ultraviolet rays during the sterilization cycle and by increasing the sterilization cycle, it is more effective in terms of stability of use even if the sterilization ability is slightly lower than a case where ultraviolet rays are emitted for a long time at a time.

The invention claimed is:

1. A method for controlling sterilization of a liquid purifier including a housing accommodating components for generating cold liquid and/or hot liquid; a liquid chute which protrudes from a front surface of the housing and includes a liquid outflow part extending downward; and a light emitting element which is mounted inside the liquid chute corresponding to an upper end of the liquid outflow part and emits ultraviolet rays for sterilization, the method comprising:

setting a first set time and a second set time for each of a plurality of sterilization cycles during one day, wherein the first set time of each of the sterilization cycles is a time for the light emitting element to be turned on and emit ultraviolet rays, and the second set time of each of the sterilization cycle is a time during which the light emitting element is to be turned off, wherein each of the sterilization cycles is defined as a sum of the first set time and the second set time;

starting a sterilization mode when the liquid purifier is powered on;

performing a first one of the sterilization cycles during the sterilization mode by:
turning on the light emitting element for the first set time and emitting ultraviolet rays through the liquid outflow part and to outside an end of the liquid outflow part; and
in response to a lapse of the first set time, turning off the light emitting element for the second set time to stop emission of the ultraviolet rays, wherein the first set time is set such that a total amount of ultraviolet rays to be emitted, during the first set time for all of the plurality of sterilization cycles for the one day, to the outside of the end of the liquid outflow part is less than 3 mJ/cm$^2$.

2. The method for controlling sterilization of the liquid purifier of claim 1,
wherein the first set time is set to one second when an emission amount of the ultraviolet rays at the end of the liquid outflow part is 0.05 mW/cm$^2$;
and a length of time for each of the plurality of sterilization cycles is 24 minutes.

3. The method for controlling sterilization of the liquid purifier of claim 1, wherein the first set time is set to one second when an emission amount of the ultraviolet rays at the end of the liquid outflow part is 0.05 mW/cm$^2$;

and a length of time for each of the plurality of sterilization cycles is 1 hour.

4. The method for controlling sterilization of the liquid purifier of claim 1, the method comprising:
  setting a length of time for all of the plurality of sterilization cycles for the one day based on the first set time.

5. The method for controlling sterilization of the liquid purifier of claim 1, the method comprising:
  in response to a lapse of the second set time during the first one of the sterilization cycles, performing a second one of the sterilization cycles during the sterilization mode by:
    turning on the light emitting element for the first set time during the second one of the sterilization cycles and emitting ultraviolet rays through the liquid outflow part and to the outside of the end of the liquid outflow part; and
    in response to a lapse of the first set time during the second one of the sterilization cycles, turning off the light emitting element for the second set time to stop emission of the ultraviolet rays.

* * * * *